United States Patent
Li et al.

(10) Patent No.: US 10,791,765 B2
(45) Date of Patent: Oct. 6, 2020

(54) ELECTRONIC CIGARETTE OF ELECTROMAGNETIC INDUCTION HEATING CAPABLE OF CALIBRATING TEMPERATURE

(71) Applicant: Shenzhen First Union Technology Co., Ltd., Shenzhen, Guangdong Province (CN)

(72) Inventors: Yuqin Li, Shenzhen (CN); Yonghai Li, Shenzhen (CN); Zhongli Xu, Shenzhen (CN)

(73) Assignee: Shenzhen First Union Technology Co., Ltd., Shenzhen (CN)

( * ) Notice: Subject to any disclaimer, the term of this patent is extended or adjusted under 35 U.S.C. 154(b) by 204 days.

(21) Appl. No.: 15/976,838

(22) Filed: May 10, 2018

(65) Prior Publication Data

US 2018/0325179 A1     Nov. 15, 2018

(30) Foreign Application Priority Data

May 10, 2017    (CN) .................... 2017 2 0513815 U

(51) Int. Cl.
*A24F 47/00* (2020.01)
*G05D 23/19* (2006.01)
(Continued)

(52) U.S. Cl.
CPC .......... *A24F 47/008* (2013.01); *A24F 40/465* (2020.01); *A24F 40/57* (2020.01);
(Continued)

(58) Field of Classification Search
CPC ........ A24F 47/00; A24F 40/465; A24F 40/57; A24F 47/008
(Continued)

(56) References Cited

U.S. PATENT DOCUMENTS

2014/0366898 A1* 12/2014 Monsees ............... A24F 47/008
                                                                  131/329
2015/0320116 A1    11/2015 Bleloch et al.
(Continued)

FOREIGN PATENT DOCUMENTS

CN    204 132 397 U    2/2015
CN    105962419 A      9/2016
(Continued)

OTHER PUBLICATIONS https://inductoheat.com/induction-heating/ accessed Jan. 5, 2020 (Year: 2020).*

*Primary Examiner* — Eric Yaary
(74) *Attorney, Agent, or Firm* — PROI Intellectual Property US; Klaus Michael Schmid

(57) ABSTRACT

An atomizer is disclosed including a heating element, being configured for heating and atomizing tobacco liquid to generate an aerosol; a tobacco liquid reservoir, being configured for storing the tobacco liquid; and a liquid drive component, being connected with the tobacco liquid reservoir directly or indirectly, and being configured for controlling a volume of tobacco liquid conveyed to the heating element, with the tobacco liquid reservoir set on the atomizer, to control the volume of tobacco liquid in the tobacco liquid reservoir conveyed to the heating element so as to convey measurable tobacco liquid as well as generate measurable aerosol.

8 Claims, 3 Drawing Sheets

(51) Int. Cl.
  *A24F 40/465* (2020.01)
  *A24F 40/57* (2020.01)
  *H05B 1/02* (2006.01)
  *H05B 3/44* (2006.01)

(52) U.S. Cl.
  CPC ......... *A24F 47/00* (2013.01); *G05D 23/1931* (2013.01); *H05B 1/0252* (2013.01); *H05B 3/44* (2013.01)

(58) Field of Classification Search
  USPC .......................................................... 131/329
  See application file for complete search history.

(56) References Cited

U.S. PATENT DOCUMENTS

| | | | | |
|---|---|---|---|---|
| 2016/0022930 | A1* | 1/2016 | Greim | A61M 15/06 |
| | | | | 131/328 |
| 2016/0174610 | A1* | 6/2016 | Kuczaj | A24F 47/008 |
| | | | | 131/328 |
| 2017/0055583 | A1 | 3/2017 | Blandino et al. | |

FOREIGN PATENT DOCUMENTS

| | | |
|---|---|---|
| CN | 205831076 U | 12/2016 |
| EP | 3 020 292 A1 | 5/2016 |
| EP | 3 047 743 A1 | 7/2016 |
| EP | 3 097 804 A1 | 11/2016 |
| GB | 2 527 597 A | 12/2015 |

* cited by examiner

ELECTRONIC CIGARETTE OF ELECTROMAGNETIC INDUCTION HEATING CAPABLE OF CALIBRATING TEMPERATURE

TECHNICAL FIELD

The present disclosure relates to the field of electronic cigarettes, and in particular, to an electronic cigarette of electromagnetic induction heating and capable of calibrating temperature.

BACKGROUND ART

Smoking smog produced in a process of combustion of the tobacco materials has tens of carcinogens, such as tars etc., which may hazard human's health pretty much. Moreover, the smoking smog spreading in the air produces a second-hand smoke, once the second-hand smoke has been sucked by human, it would harm the health. Therefore, smoking is prohibited in public area. To satisfy some smokers' need, the electronic cigarettes appeared.

In the current market, the electronic cigarette realizes heating by using a heating wire, the shortage of the heating wire is slow reaction and low conductivity efficiency. The temperature can't be accurately controlled so that the smoking smog contains a burnt flavor. A Chinese patent CN201420564863.7 published an atomizer and an electronic cigarette having the same, a coil of which produces a high-frequency current as well as produces a fast pace changing magnetic field. Magnetic heater generates vortex and heat in the magnetic field, enabling the tobacco liquid to be atomized. The previous electronic cigarette has a problem that the temperature in the heater can't be accurately controlled.

A Chinese patent CN201610438721.X published "an electronic cigarette capable of achieving electromagnetic induction heating" including a heating assembly and an electromagnetic coil, and a temperature control system. The temperature control system includes an electromagnetic coil processor and a temperature sensor. The temperature sensor is configured for detecting the temperature of the atomizer. However, due to the temperature sensor itself has a certain heating condition in the electromagnetic field, the temperature detected by the temperature sensor can't be accurate.

SUMMARY

In view of the drawbacks in the electronic cigarette known to the inventors, the technical problem to be solved by the present disclosure is providing an electronic cigarette of electromagnetic induction heating and capable of accurately calibrating temperature in multiple regulation modes.

To overcome the above shortages, the present disclosure relates to an electronic cigarette of electromagnetic induction heating and capable of accurately calibrating temperature including: an atomization assembly having a hollow sleeve; a holder is disposed inside the sleeve; the holder has a chamber formed therein; between the sleeve and the holder there is an induction coil; a heating element passes through bottom of the holder, an upper end of the heating element protrudes into the holder, an lower end of the heating element is connected with the first temperature detecting device, a second temperature detecting device is arranged adjacent to the first temperature detecting device, the first temperature detecting device and the second temperature detecting device are both connected to a microprocessor.

The electronic cigarette has a memory, the memory is connected to the microprocessor; the memory stores a temperature difference $T(L)$ between the first temperature detecting device and the second temperature detecting device; the temperature difference $T(L)$ is a constant based on relative positions of the two temperature detecting devices and a magnetic density.

A formula stored in the memory, $T14=T1-T2-T(L)$, in which, $T14$ is a real temperature of the heating element, $T1$ is a real-time temperature detected by the first temperature detecting device; $T2$ is a real-time temperature detected by the second temperature detecting device.

The induction coil is connected with a converter.

The second temperature detecting device and the first temperature device have a same physical structure.

A solid tobacco material is disposed in the chamber of the holder; the heating element is shaped as a rod that an upper end protrudes into the solid tobacco material.

The upper end of the heating element is spiral, a hollow absorbing cotton is disposed inside the chamber of the holder; the absorbing cotton is affixed to inside wall of the holder; an upper end of the heating element is affixed to the absorbing cotton; a side wall of the holder has an liquid inlet in communication with the liquid storage chamber of the electronic cigarette, the tobacco liquid flows from the liquid storage chamber into the liquid inlet and is absorbed by the absorbing cotton.

A sealing element is disposed at bottom of the holder, the sealing element seals a position where the holder contacts the heating element.

The microprocessor is connected to a power supply controller; the microprocessor is capable of controlling a power supply switch or adjusting an output power of the microprocessor.

Outside of the electronic cigarette has a button for selecting modes, the button is configured for selecting temperature values under different modes.

Compared to the prior art known to the inventors, adopting two temperature detecting devices to monitor and calibrate real-time temperatures in the present disclosure, the temperature of the heating element in the electronic cigarette can be accurately controlled during working, without burnt flavor in the smoking smog or astringent flavor because of inadequate heating. Therefore, the user experience is greatly improved.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
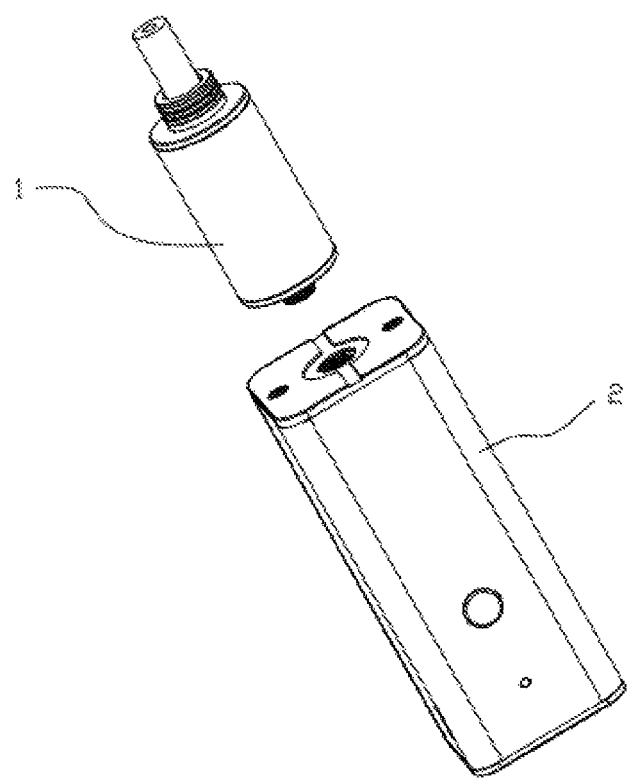
FIG. 1 is an aspect view of an electronic cigarette of electromagnetic induction heating capable of calibrating temperature according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
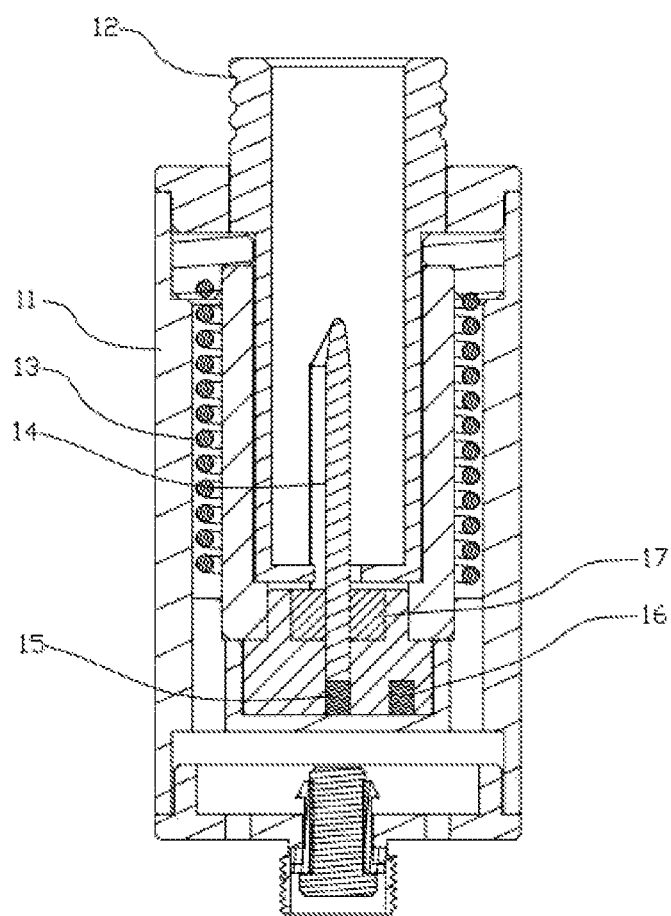
FIG. 2 is a cross-sectional view of an electronic cigarette of electromagnetic induction heating capable of calibrating temperature according to an embodiment of the present disclosure.

Referring to FIG. 1 and FIG. 2, the present disclosure generally relates to an electronic cigarette of electromagnetic induction heating capable of calibrating temperature, including an atomization assembly 1 and a power supply set 2 that are connected by a thread, belonging to a detachable structure. The atomization assembly 1 has a hollow sleeve 11. A holder 12 is disposed inside the sleeve 11 with a chamber formed therein. Between the sleeve 11 and the holder 12 there is an induction coil 13. The induction coil 13 is set to surround the holder 12. The holder 12 has an opening at the bottom thereof. The heating element 14 passing through the opening of the holder 12, an upper end of the heating element 14 protrudes into the holder 12. An lower end of the heating element 14 is connected with the first temperature detecting device 15, a second temperature detecting device 16 is arranged adjacent to the first temperature detecting device 15, the first temperature detecting device 15 and the second temperature detecting device 16 are both connected to a microprocessor arranged inside the electronic cigarette.

A solid tobacco material is disposed in the chamber of the holder 12. The heating element 14 is shaped as a rod that an upper end thereof protrudes into the solid tobacco material. When the electricity is applied to the induction coil 13, the heating element 14 generates vortex and heat under the electromagnetic induction, therefore, the temperature of the heating element 14 may be controlled in a certain range, the solid tobacco material generates smoking smog under a low-temperature baking, then the smoking smog is sucked by the users. However, the solid tobacco material is not combusted, without the hazardous of noxious gas and tar produced during combustion.

According to another embodiment, an upper end of the heating element 14 is spiral, an absorbing cotton is disposed inside the chamber of the holder 12. The absorbing cotton is affixed to inside wall of the holder 12; an upper end of the heating element 14 is affixed to the absorbing cotton; a side wall of the holder 12 has an liquid inlet in communication with the liquid storage chamber of the electronic cigarette, the tobacco liquid flows from the liquid storage chamber into the liquid inlet then is absorbed by the absorbing cotton. Therefore, tobacco liquid may adhere to the upper end of the heating element 14, the heating element 14 may generate vortex and heat under the electromagnetic induction of the induction coil 13. The temperature of the heating element 14 is controlled in a certain range, so that the tobacco liquid in the heating element 14 may be atomized to generate an aerosol that is sucked by users. The aerosol is exclusive of tar or all kinds of noxious material in the traditional cigarette, which is very healthy and environmental friendly.

If the temperature of the heating element 14 is overly high, the aerosol may contain burnt flavor. If the temperature is overly low, the taste of the aerosol fails to reach a preset expectation. As a result, the temperature range of the heating element 14 needs to be controlled. The lower end of the heating element 14 is connected with the first temperature device 15. When the heating element 14 itself generates heat, the temperature of the heating element 14 is conducted to the first temperature device 15 so that the temperature of the first temperature device 15 is increased. The real-time temperature detected by the first temperature device 15 is T1. During the electromagnetic induction heating process, it would generate alternative electromagnetic field inside of the atomization assembly; due to the temperature detecting elements contains metallic materials, the first temperature detecting device 15 itself generates vortex and heat because of the electromagnetic induction. Due to the real-time temperature T1 detected by the first temperature device 15 is higher than the real temperature of the heating element 14. To calibrate this deviation, a second temperature device 16 is adjacent to the first temperature device 15 that has a same physical structure as the second temperature device 16, but just disposed at different places. When the induction coil 13 is working, the second temperature device 16 generates vortex and heat itself due to the electromagnetic induction, a real-time temperature detected by the second temperature device 16 is T2.

The real temperature of the heating element 14 refers to this formula: T14=T1−T2−T(L).

After one kind of electronic cigarette has been designed and manufactured out, a location space L between the first temperature device 15 and the second temperature device 16 must be a constant value, temperature deviation T(L) represents a temperature deviation when the first temperature device 15 and the second temperature device 16 are located at different places, which is relative with the electromagnetic intensity and the location space L between the two temperature devices, that is, when the electromagnetic intensity is fixed and the location space L is fixed, the temperature deviation T(L) is a constant value. The temperature deviation T(L) may be detected by one same temperature device around the same distance that the temperature device is away from the first temperature device 15 and the second temperature device 16 respectively. The temperature deviation T(L) is detected in advance before the electronic cigarette leaving the factory, and stored in the memory of the electronic cigarette.

Based on the above formula and corresponding devices, we may calculate the real temperature of the heating element 14.

Figure 3:
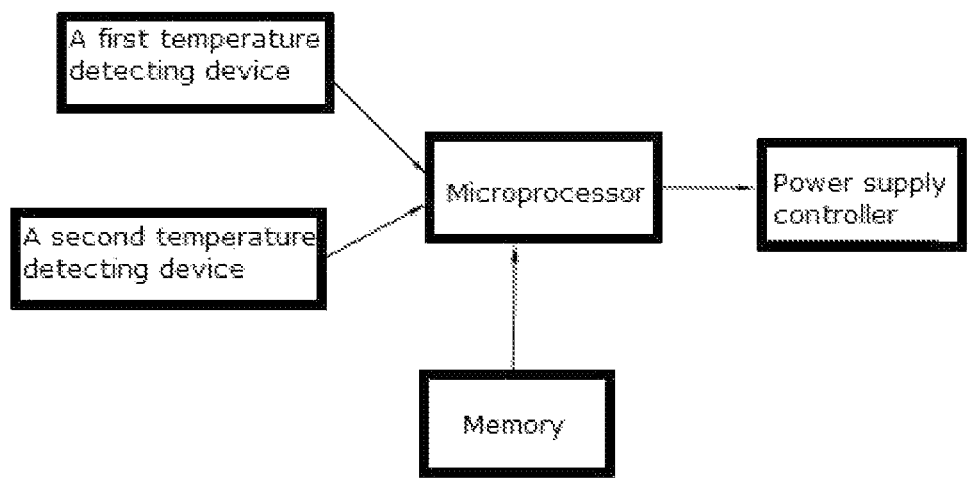
FIG. 3 is a block diagram showing an electronic cigarette of electromagnetic induction heating capable of calibrating temperature according to an embodiment of the present disclosure.

As shown in FIG. 3, the memory has stored locations of the first temperature device 15 and the second temperature device 16, the distance of their locations and so on, those information has been stored before the electronic cigarette leaves the facture. When the induction coil 13 is supplied with the electricity, the microprocessor respectively selects the temperature data T1 and T2 from the first temperature device 15 and the second temperature device 16, then the microprocessor obtains the information of the locations of the two temperature devices, and calculates the real temperature of the heating element according to the formula: T14=T1−T2−T(L). In addition, the memory has also stored a preset temperature value T01 which represents the real optimum operating temperature. The microprocessor compares temperature T14 with T01, when T14 is less than T01, the microprocessor controls the power supply set to continue to heat until then T14 is equal to T01. When T14 is bigger than T01, the microprocessor controls the power supply controller to cut off the electricity or reduce the output power.

In addition, the heated object of the heating element 14 may be changed since everyone's using habit is different, it may store multiple sets of data in the memory beforehand, such as T01, T02, T03 and so on. Outside of the electronic cigarette has a button for selecting modes, the button is configured for selecting temperature values under different modes, and users may regulate a preset temperature value to any satisfying temperature value that is stored in the memory. In a process of the electronic cigarette working, the microprocessor obtains a preset temperature value comparing to the temperature T14, the temperature of the heating element 14 may be accurately controlled, giving user a better experience.

A sealing element 17 is disposed at bottom of the holder 12. The sealing element 17 seals a position where the holder 12 contacts the heating element 14, preventing the solid tobacco material or tobacco liquid from infiltrating downward.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An electronic cigarette of electromagnetic induction heating capable of accurately calibrating temperature, comprising:
an atomization assembly having a hollow sleeve;
a microprocessor;
wherein, a holder is disposed inside the sleeve; the holder has a chamber formed therein; between the sleeve and the holder there is an induction coil; a heating element passes through bottom of the holder, an upper end of the heating element protrudes into the holder; an lower end of the heating element is connected with the first temperature detecting device; a second temperature detecting device is arranged adjacent to the first temperature detecting device; the first temperature detecting device and the second temperature detecting device are both connected to the microprocessor;
wherein the electronic cigarette further comprises a memory, wherein the memory is connected to the microprocessor; the memory stores a temperature difference T(L) between the first temperature detecting device and the second temperature detecting device; the temperature difference T(L) is a constant based on relative positions of the two temperature detecting devices and a magnetic density;
wherein the microprocessor is configured for calculating a real temperature of the heating element according to a formula stored in the memory:

$$T14=T1-T2-T(L),$$

in which, T14 is the real temperature of the heating element, T1 is a real-time temperature detected by the first temperature detecting device; T2 is a real-time temperature detected by the second temperature detecting device.

2. The electronic cigarette according to claim 1, wherein the induction coil is connected with a converter.

3. The electronic cigarette according to claim 1, wherein the second temperature detecting device and the first temperature device have a same physical structure.

4. The electronic cigarette according to claim 1, wherein a solid tobacco material is disposed in the chamber of the holder; the heating element is shaped as a rod that an upper end protrudes into the solid tobacco material.

5. The electronic cigarette according to claim 1, wherein the upper end of the heating element is spiral, a hollow absorbing cotton is disposed inside the chamber of the holder; the absorbing cotton is affixed to inside wall of the holder; an upper end of the heating element is affixed to the absorbing cotton; a side wall of the holder has an liquid inlet in communication with the liquid storage chamber of the electronic cigarette, the tobacco liquid flows from the liquid storage chamber into the liquid inlet and is absorbed by the absorbing cotton.

6. The electronic cigarette according to claim 1, wherein a sealing element is disposed at bottom of the holder, the sealing element seals a position where the holder contacts the heating element.

7. The electronic cigarette according to claim 1, wherein the microprocessor is connected to a power supply controller; the microprocessor is capable of controlling a power supply switch or adjusting an output power of the microprocessor.

8. The electronic cigarette according to claim 1, wherein outside of the electronic cigarette comprises a button for selecting modes, the button is configured for selecting temperature values under different modes.

* * * * *